United States Patent
Quigley et al.

[11] Patent Number: 5,332,075
[45] Date of Patent: Jul. 26, 1994

[54] FRICTION DISC WITH SEGMENTED FRICTION FACING

[75] Inventors: James Quigley, Lombard; Gerald Gronowski, Hoffman Estates; Richard Veit, Addison; Shawn Hyken, Carol Stream, all of Ill.

[73] Assignee: Borg-Warner Automotive, Inc., Sterling Heights, Mich.

[21] Appl. No.: 1,102

[22] Filed: Jan. 6, 1993

[51] Int. Cl.$^5$ ............................... F16D 13/60
[52] U.S. Cl. .................. 192/107 R; 192/70.13; 188/218 XL
[58] Field of Search .......... 192/107 R, 70.13; 188/250 B, 218 XL

[56] References Cited

U.S. PATENT DOCUMENTS

| | | | |
|---|---|---|---|
| 1,292,666 | 1/1919 | Waite | 192/107 R |
| 2,144,831 | 1/1939 | Burns | 192/107 R |
| 2,330,856 | 10/1943 | Adamson | 192/68 |
| 2,690,248 | 9/1954 | McDowell | 192/113 |
| 2,850,118 | 9/1958 | Byers | 188/71 |
| 3,042,168 | 7/1962 | Binder | 192/107 |
| 3,094,194 | 6/1963 | Kershner | 188/72 |
| 3,198,295 | 8/1965 | Fangman | 188/264 |
| 3,250,349 | 5/1966 | Byrnes | 188/218 |
| 3,412,831 | 11/1968 | Marcheron | 188/218 |
| 3,412,836 | 11/1968 | Wilmer | 192/107 |
| 3,491,865 | 1/1970 | Stockton | 192/70.14 |
| 3,534,842 | 10/1970 | Davison | 192/113 |
| 3,730,320 | 5/1973 | Freeder | 192/107 M |
| 3,871,934 | 3/1975 | Marin | 156/94 |
| 3,885,659 | 5/1975 | Smith | 192/107 R |
| 3,927,241 | 12/1975 | Augustin | 428/408 |
| 3,937,303 | 2/1976 | Allen | 188/73.2 |
| 4,027,758 | 6/1977 | Gustavsson | 192/113 B |
| 4,139,085 | 2/1979 | Kanbe | 192/107 R |
| 4,260,047 | 12/1979 | Nels | 192/70.14 |
| 4,396,100 | 8/1983 | Eltze | 192/70.12 |
| 4,449,621 | 5/1984 | F'Geppert | 192/70.13 |
| 4,674,616 | 6/1987 | Mannino | 192/107 R |
| 4,726,455 | 2/1988 | East | 192/107 |
| 4,878,282 | 11/1989 | Bauer | 29/149.5 |
| 4,913,267 | 4/1990 | Campbell | 188/218 X L |
| 4,995,500 | 2/1991 | Payvar | 192/107 R |
| 5,094,331 | 3/1992 | Fujimoto | 192/70.12 |
| 5,101,953 | 4/1992 | Payvar | 192/107 R |

*Primary Examiner*—Leslie A. Braun
*Assistant Examiner*—Andrea Pitts
*Attorney, Agent, or Firm*—Emch, Schaffer, Schaub

[57] ABSTRACT

A friction disc (110) includes a pair of segmented friction facings (112) adhered to the opposing sides of annular core (114). The friction facings (112) are composed of three arcuate segments (116) of sintered material or paper impregnated with a resin interjoined together at match lines (118) located generally 120° apart. Each arcuate segment (116) includes opposed ends having tab and slot configurations which are designed to have a pair of arcuate edge lines (124, 126), (124', 126') located in an opposed relationship proximate the annular centerline of the width of the segment (116). An interconnector edge line (128), (128') is located angularly across the annular centerline of the segment (116) and joined tangentially to the arcuate match lines (124, 126), (124', 126'). The remaining end of each arcuate match line (124, 126), (124', 126') is then joined to the respective inside annular edge (134) and outside annular edge (136) of each arcuate segment (116).

10 Claims, 3 Drawing Sheets

FRICTION DISC WITH SEGMENTED FRICTION FACING

BACKGROUND ART

The present invention relates to friction plate facings which are conventionally bonded to metal plates or cores which are then incorporated into interleaved clutch packs. The clutch packs, generally, are interconnected with inner hubs and outer drums of a clutch assembly and are commonly engaged and disengaged through the use of a hydraulically or spring actuated piston. The typical friction disc used in such clutch packs commonly incorporates an annular steel ring or core and a pair of friction facings which are bonded to the opposed sides of the core. The friction facings are commonly blanked out as one piece rings from continuous rolls of friction material such as a sintered metal or paper impregnated with a resin which is fed through a blanking press. As the costs of such friction paper raw material increase and as industry becomes more accountable for its scrap and the need to properly dispose of the scrap, it has become a major objective to economize the amounts of friction paper utilized in manufacturing friction facings and, concomitantly, reduce the amount of scrap or offal remaining without compromising the strength or integrity of the end product friction ring.

U.S. Pat. No. 4,260,047, issued to Nels, represents one of the first proposed solutions for achieving greater economy in the manufacture of friction facings. Nels provides four ninety degree arcuate segments stamped from a rectangular sheet of pregrooved friction material. The segments are interconnected by opposed tab and slot structures to form a complete annular friction facing which is then bonded onto an annular metal core. The approach of Nels was further improved upon by Mannino in U.S. Pat. No. 4,674,616 wherein the annular core plate or steel plate is also segmented with interlocking end portions to form the annular ring to which the segmented facings are bonded. The Nels and Mannino approaches have achieved a first step in reducing the waste amounts of friction material and the waste amounts of steel in the manufacture of friction discs for use in clutch packs.

It has been discovered, however, that the match lines or junctions formed between the facing segments when the arcuate segmented facings are interjoined to create the annular ring create areas of structural weakness in the overall integrity of the friction facing. It has been particularly noticed that match lines or junctions which are disposed ninety degrees apart suffer the greatest potential for premature failure. Further, the opposed tab/slot configurations utilized by the facings of the type shown in Nels and Mannino have shown a tendency to isolate the forces applied to the match lines on the facings to specific fragile areas of interconnection. This tendency may then also increase the potential for premature failure. Thus, it is an object of the present invention to significantly reduce the amounts of friction paper utilized in the manufacture of friction facings without compromising the structural integrity of the final annular friction ring product.

It is another object of the invention to further economize the manufacture of friction face by further reducing the production of scrap material to minimal amounts.

It is a further object of the invention to reduce the number of match lines in a formed annular friction facing, thereby reducing the potential for premature failure.

It is yet another object of the invention to eliminate match lines located at ninety degree intervals.

Yet another object of the invention is to provide for a unique tab and slot configuration at each end of each facing segment which interlocks with the tab and slot configuration on an adjacent segment and provides opposing forces on the match line between the segments which emanate from the center of each match line.

It is yet another object of the invention to provide that the opposing faces on the match line provide resistance to forces applied in multiple directions.

Finally, it is an object of the invention to provide for further reinforcement of the match line area to prevent potential damage to the friction material prior to the final bonding of the friction facing to the annular core.

DISCLOSURE OF INVENTION

The present invention provides for an improved segmented friction facing for use with an annular core or plate to produce a friction disc intended for use in an interleaved clutch. The segments from which the annular friction facing is formed each generally comprise a 120° arc. Thus, each annular facing includes three segments whose match lines are not separated by 90° intervals. Thus, the opposing forces encountered at the match lines or joints of the interjoined facings are easily absorbed without overstressing areas of structural weakness. The arcuate segments of the friction material are interlocked through a tab and slot configuration which is formed on each end of each arcuate segment. It is envisioned that the facings may be assembled in such a manner as to permit the use of alignment pins for handling, orientation and alignment of the segments for assembly and bonding as well as oil circulation throughout the friction disc for cooling. The facing segments are interlocked through their tab and slot configuration and, if necessary, porous tape is used to reinforce the match line between the segments.

BEST MODE OF CARRYING OUT INVENTION

Figure 1:
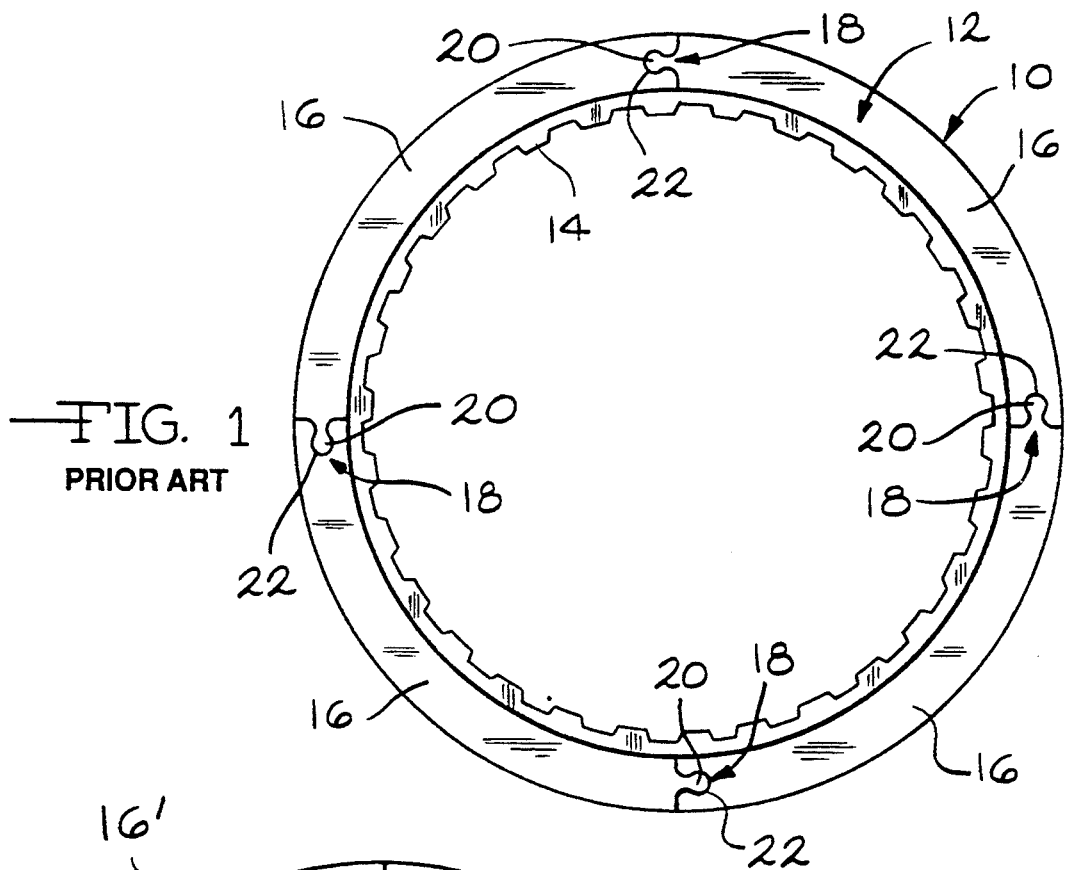
FIG. 1 is an elevational view of a prior art friction disc having four segmented friction facings with tab and slot configured match lines located on 90° orientations.
Figure 2:
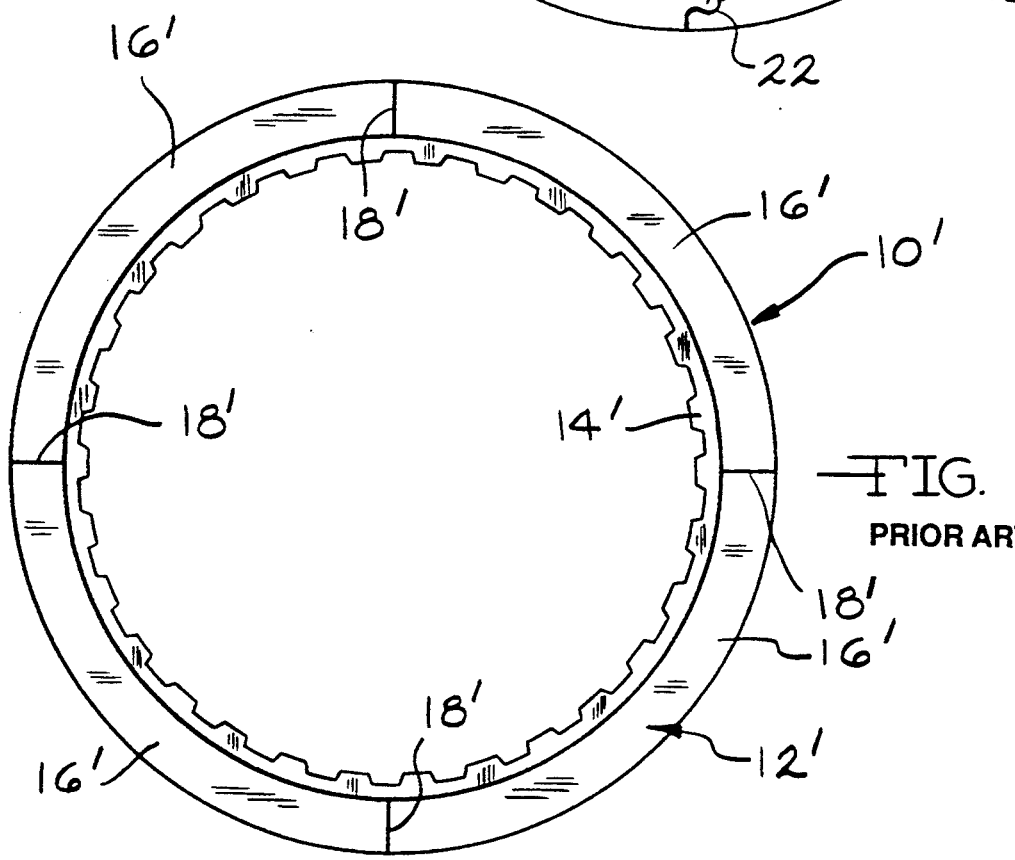
FIG. 2 is an elevational view of a prior art friction disc having flat match lines located on a 90° orientation.

Referring with particularity to FIG. 1, a common prior art embodiment of a friction disc 10 is shown wherein the friction facing 12 is adhered to an annular core 14. The facing 112 is composed of four individual arcuate segments 16 joined at match lines 18 to create the annular facing 12. FIG. 1 discloses a match line 18 similar to that disclosed by U.S. Pat. No. 4,260,047 to Nels. These match lines 18 are formed from a tab 20 located at one end of the segment 16 engaging with a slot 22 located at the opposed end of an adjacent segment 16. Referring now to FIG. 2, another embodiment of a prior art friction disc 10' is shown having an annular friction facing 12' adhered to an annular core 14'. The facing 12' is composed of four individual arcuate segments 16' joined at match lines 18'. The match lines 18' are created from the ends of adjacent the segments 16' abutting one another to form the annular facing 12'. The embodiments shown in FIGS. 1 and 2 represent common prior art facing segments that the present invention intends to improve upon.

Figure 3:
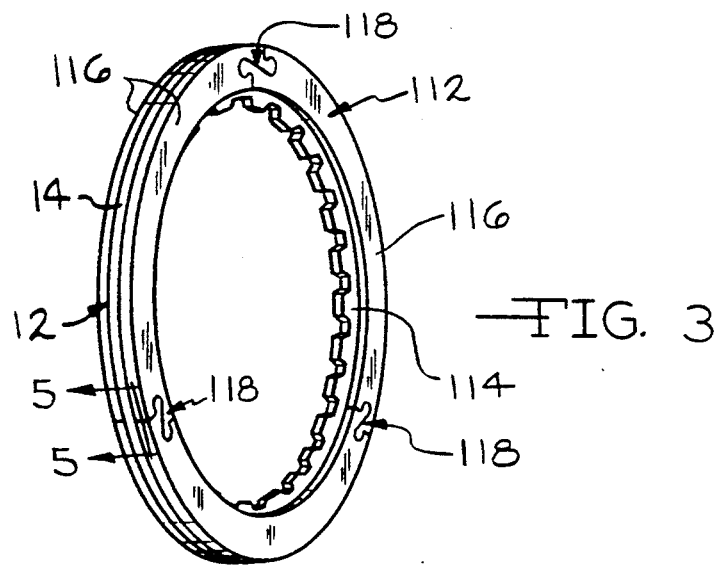
FIG. 3 is a perspective view of the friction disc of the present invention having friction facings composed of three segments having match lines oriented 120° apart.
Figure 4:
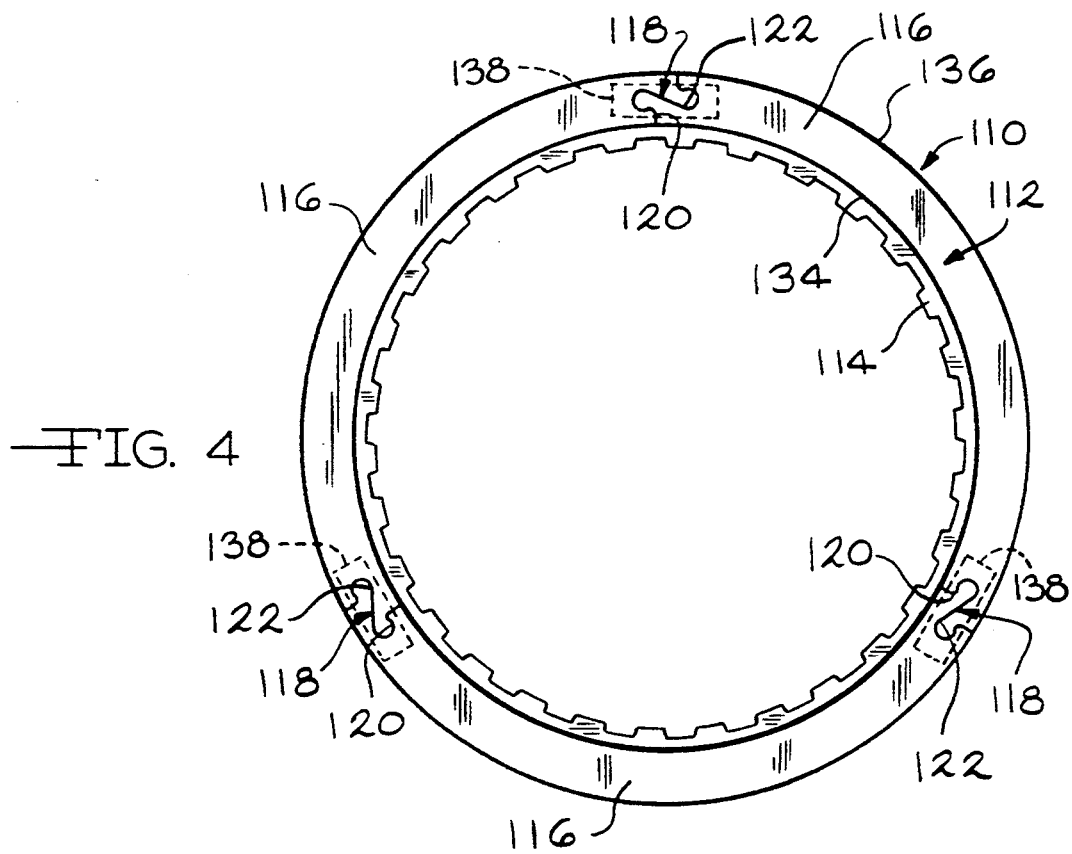
FIG. 4 is an elevational view of the friction disc of FIG. 3.
Figure 5:
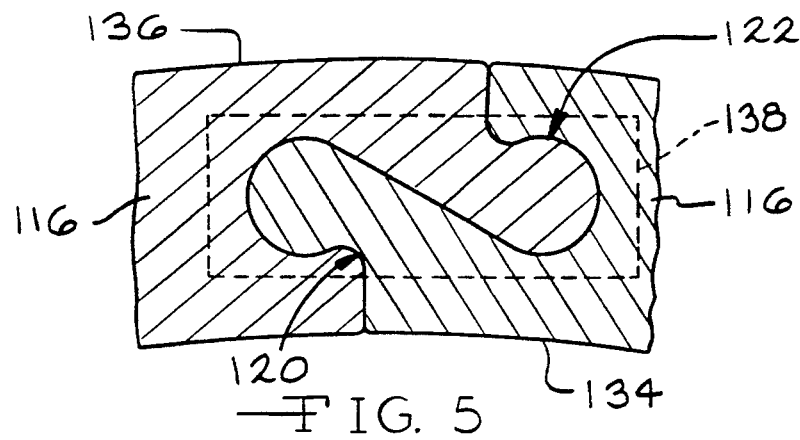
FIG. 5 is a sectional view of the match line taken along line 5—5 of FIG. 3; and, FIG. 6 is the sectional view of FIG. 5 showing the interlocked segments of FIG. 5 in a separated position.
Figure 6:
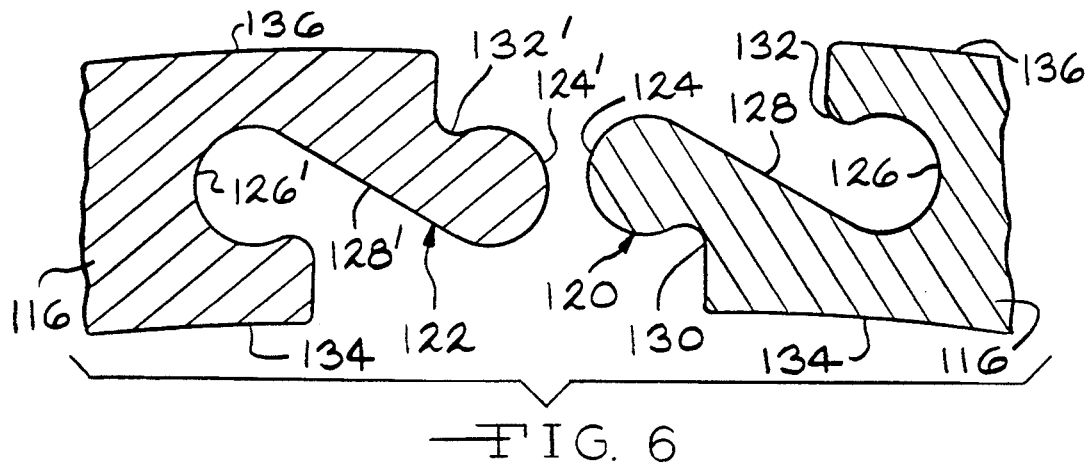

Referring now to FIGS. 3 and 4, the preferred embodiment of the friction disc 110 of the present invention is shown. The friction disc 110 includes a pair of annular segmented friction facings 112 which are adhered to the opposed sides of an annular core 114. The friction facings 112 are composed of three arcuate segments 116 of sintered material or paper impregnated with a resin. The arcuate segments 116 are interjoined together at match lines 118 located generally 120° apart. In the preferred embodiment, each end of each arcuate segment 116 includes a tab and slot configuration, detailed in FIGS. 5 and 6. The tab and slot configured edge 120 formed on one end of any given arcuate segment 116 is, preferably, the mirror image of the tab and slot configured edge 122 located on the opposed end of the given arcuate segment 116. Thus, when a series of three 120° segments 116 are laid end to end to form an annular friction ring 112, the edges 120, 122 of the juxtaposed segments 116 interjoin together to form the match line 118. Each tab and slot configured edge 120, 122 include a pair of arcuate edge lines 124, 126 and 124', 126' respectively, which are located in opposed relationship proximate the annular centerline of the width of the segment 116. The preferred diameter (D) of each arcuate edge line 124, 126 and 124', 126' is equal to 3/7 of the segment 116 width (W):

$$D = 3/7 W$$

After the diameters of the arcuate edge lines 124, 126 and 124', 126' are calculated, the edge lines 124, 126 and 124', 126' are located along the centerline of the width of the segment 116 at each segment end. An interconnector edge line 128, 128' located angularly across the annular centerline of the segment 116, is tangentially engaged between the respective arcuate edge lines 124, 126 and 124', 126'. The remaining free end of each arcuate edge line 124, 126 and 124', 126' is tangentially engaged with a second arcuate edge line 130, 132 and 130', 132' respectively, which second arcuate edge line 130, 132 and 130', 132' is extended radially to the respective inside 134 and outside 136 annular edges of the arcuate segment 116. The preferred radius (R) for each of the second arcuate edge lines is equal to 0.08 of the segment 116 width (W):

$$R = 0.08 W$$

The location of the center of the radius R is, preferably, positioned perpendicularly to the interconnector edge line 128, 128' from the annular centerline of the segment 116 at a distance (d) equal to 0.3 of the segment width (W):

$$d = 0.3 W$$

Thus, the second arcuate edge lines 130, 132 and 130', 132' are tangentially engaged with their respective arcuate edge lines 124, 126 and 124', 126' and then extended radially to their respective inside and outside annular edges 134, 136. The preferred angle between the radial extensions of the second arcuate edge lines is 3.4°.

As seen in FIGS. 3-6, the mirror image tab and slot edges 120, 122 located on each end of the segments 116 are joined to create a strong annular match line 118 across the centerline of the engaged arcuate segments 116. This shape of the match line 118 produced by the engaged tab and slot edges 120, 122 will provide for the distribution of opposing forces from the center of each match line, allowing the opposing edges 120, 122 to provide resistance to forces in multiple directions. One tab and slot edge 120 will not receive stronger or greater forces than its mating tab and slot edge 122. Forces are equalized across the match line 118 with equivalent distributions.

Figure 7:
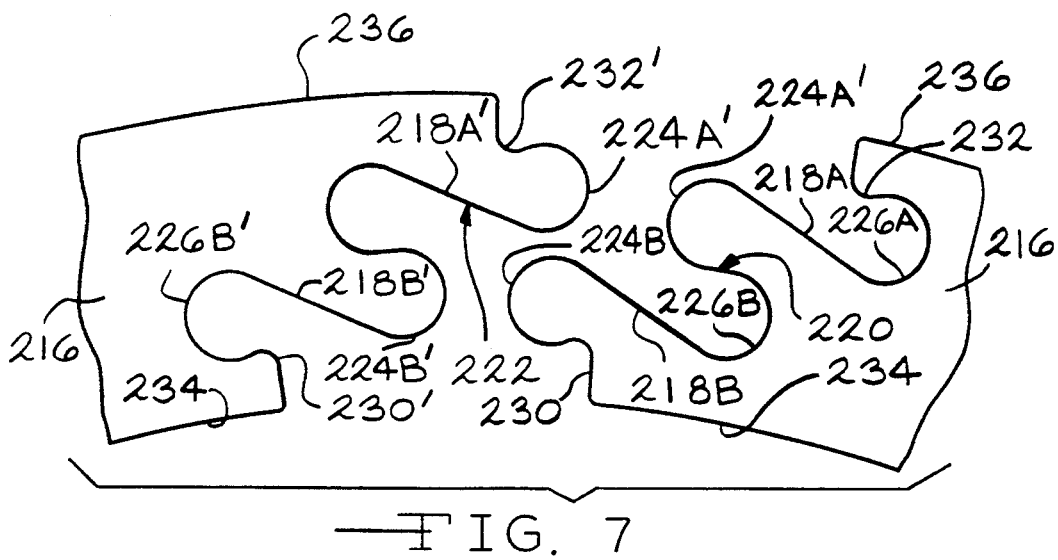
FIG. 7 is a diagrammatic view of an alternative embodiment of a match line as envisioned for use with the present invention.

Referring now to FIG. 7, an alternative embodiment of the present invention is shown in which the mirror image tab and slot edge lines 220, 222 are generally formed at the one-third and two-third position of the width of the arcuate segment 216. The tab and slot edge lines 220, 222 are formed using the same principles that guided the design of the preferred embodiment, however, each edge line 220, 222 of each end of each arcuate segment 216 includes two pairs of arcuate edge lines 224A, 224B and 224A', 224B' respectively, in opposition relationship with arcuate edge lines 226A, 226B and 226A', 226B' respectively. Each set of opposed arcuate edge lines 224A, 226A and 224A', 226A' are interjoined by an interconnector edge line 228A, and arcuate edge line 224B, 226B and 224B', 226B' are interjoined by an interconnector edge line 228B, 228B'. Lines 228A, 228A' and 228B, 228B' are extended tangentially between their respective opposed arcuate edge lines so as to angularly cross the one-third and two-third positions of the width of the segment 216. Each of the arcuate edge lines 224A, 226B and 224A', 226B' positioned proximate the inside annular edge 234 and outside annular edge 236 of the arcuate segment 216 are tangentially engaged with respective second arcuate edge lines 230, 232 and 230', 232' respectively, which second arcuate edge lines 230, 232 and 230' and 232' are extended radially to the inside 234 and outside 236 annular edges, respectively.

Thus, as with the preferred embodiment, the mirror image tab and slot edges 220, 222 of the embodiment shown in FIG. 7 are joined to create a strong angular match line 218 positioned across the width of the interjoined segments 216. The match line 218 produced by the engaged tab and slot edges 220, 222 will provide for opposing forces distributed in multiple directions, thereby equalizing the forces across the full match line.

Finally, it is envisioned that these segmented facings which are typically assembled into full rings and then moved to a bonding machine for final bonding to a friction plate can be structurally fragile and can easily be damaged in the material handling process. To produce greater strength at the match lines of the annular friction facings, tape 138, preferably porous tape, is adhered to the segments over the match lines. The segments may then be locked together by the porous tape and this taped intersection may be used with match lines that vary from simple straight cuts to the complex interlocking tabs as shown in FIGS. 3–6. The tape is placed on the segmented facings so that the end assembly of the friction disc has the porous tape sandwiched between the facing and the annular core plate during the bonding process. By using the sandwiched construction, the tape is permanently bonded into the assembly with no visible or functional evidence of the tape being present. Preferably the tape being used is of a porous paper or fibrous cloth material that has adhesive on one side. During the final bonding process, the porous tape will allow the bonding adhesive to saturate through the tape and bond the metal plate to the entirety of the friction material, through the porous tape.

The above description of the invention has been intended to be illustrative in nature and is not intended to be solely limiting upon the scope and content of the following claims.

We claim:

1. A friction disc (110) for use in a clutch or brake assembly comprising: an annular core plate (114) and at least one substantially annular friction facing (112) adhered to said annular core plate (114), said friction facing (112) being composed of at least three arcuate segments (116) joined together at match lines (118), each arcuate segment (116) defining an inside arcuate edge (134) and an outside arcuate edge (136), and porous tape applied across the match line (118) formed by the joinder of said arcuate segments (116), whereby said friction facing (112) is oriented with respect to said core plate (114) such that said tape is interposed between said friction facing (112) and said core plate (114).

2. A friction disc (110) for use in a clutch or brake assembly comprising: an annular core plate (114) and at least one substantially annular friction facing (112) adhered to said annular core plate (114), said friction facing (112) being composed of at least three interjoined arcuate segments (116), each arcuate segment (116) having a first end and an opposed end, defining an inside arcuate edge (134) and an outside arcuate edge (136), the first end of each arcuate segment (116) including an interlocking tab and slot edge (120) and the opposed end including a mirror-image tab and slot edge (122), whereby said tab and slot edges (120, 122) of adjacent segments (116) interconnect to create a first match line and a second match line positioned at an angle of intersection with said first match line, said angle of intersection being defined by the mating of a first arcuate edge line (124) of a first arcuate segment (116) with a mirror-image second arcuate edge line (126') of the adjacent interconnected segment (116), and a third match line positioned to intersect said first match line, at a location spaced from and opposed to the intersection of said first match line and said second match line, at a second angle of intersection defined by the mating of a second arcuate edge line (126) of such first arcuate segment (116) with a mirror-image first arcuate edge ilne (124') of the adjacent interconnected segment (116), and porous tape applied across at least one of said match lines, wherein said friction facing (112) is oriented with respect to said core plate (114) such that said tape is interposed between said friction facing (112) and said core plate (114).

3. A friction disc (110) for use in a clutch or brake assembly comprising: an annular core plate (114) and at least one substantially annular friction facing (112) adhered to said annular core plate (114), said friction facing (112) being composed of three arcuate segments (116), each arcuate segment having a first end and an opposed end and defining an inside arcuate edge (134) and an outside arcuate edge (136), the first end of each arcuate segment (116) including an interlocking tab and slot edge (120) and the opposed end including a mirror-image tab and slot edge (112), whereby said tab and slot edges (120, 122) interconnect to create a first match line and at least one other match line positioned at an angle of intersection with said first match line, said angle of intersection being defined by the mating of a first arcuate edge line (124, 124') with a second arcuate edge line (126, 126'), wherein said arcuate edge lines (124, 126) (124', 126') each have a diameter substantially equivalent to 3/7 of said segment (116) width, whereby the diameter is substantially centered between the inside arcuate edge (134) and the outside arcuate edge (136) of said arcuate segment (116).

4. The friction disc (119) of claim 3 further including an interconnector edge line (128, 128'), wherein said arcuate edge lines (124, 126)(124', 126') are tangentially interjoined by said interconnector edge line (128, 128') angularly positioned and substantially centered between said inside arcuate edge (134) and said outside arcuate edge (136), wherein the interconnector edge lines (128, 128') of said respective interjoined segments (116) match to create said first match line.

5. A friction disc (110) for use in a clutch or brake assembly comprising: an annular core plate (114) and at least one substantially annular friction facing (112) adhered to said annular core plate (114), said friction facing (112) being composed of at least three arcuate segments (116), each segment having a first end and an opposed end and defining an inside arcuate edge (134) and an outside arcuate edge (136), the first end of each arcuate segment including an interlocking tab and slot edge (120) and the opposed end including a mirror-image tab and slot edge (122), whereby said tab and slot edges (120, 122) of adjacent segments (116) interconnect to create a first match line and a second match line positioned at an angle of interconnection with said first match line, said angle of intersection being defined by the mating of a first arcuate edge line (124) of a first arcuate segment (116) with a mirror-image second arcuate edge line (126') of the adjacent interconnected segment (116), and a third match line positioned to intersect said first match line, at a location spaced from and opposed to the intersection of said first match line and said second match line, at a second angle of intersection defined by the mating of a second arcuate edge line (126) of such first arcuate segment (116) with a mirror-image first arcuate edge line (124') of the adjacent interconnected segment (116), wherein each of said first (124, 124') and second (126, 126') arcuate edge lines has a diameter substantially equivalent to 3/7 of said segment (116) width, whereby each respective diameter is positioned in opposition to the other and is substantially centered between the inside arcuate edge (134) and the outside arcuate edge (136) of said arcuate segments (116).

6. The friction disc (110) of claim 5 further including an interconnector edge line (128, 128'), wherein said arcuate edge lines (124, 126), (124', 126') are tangentially interjoined by said interconnector edge line (128, 128') angularly positioned and substantially centered between said inside arcuate edges (134) and said outside arcuate edges (136), wherein the interconnector edge lines (128, 128') of said respective interjoined segments (116) match to create said first match line.

7. A friction disc (110) for use in a clutch or brake assembly comprising: an annular core plate (114) and at least one substantially annular friction facing (112) adhered to said annular core plate (114), said friction facing (112) being composed of at least three arcuate segments (116), each arcuate segment having a first end and an opposed end and defining an inside arcuate edge (134) and an outside arcuate edge (136);

said first end of each arcuate segment having a tab member generally defined by an arcuate edge line (124) which is substantially centered between said inside arcuate edge (134) and said outside arcuate edge (136) and a slot member, in opposition to said tab member, generally defined by a second arcuate edge line (126) which is substantially centered between said inside arcuate edge (134) and said outside arcuate edge (136) in opposition to said first arcuate edge line (124); and said opposed end of each arcuate segment (116) having a tab member, generally the mirror-image of the slot member defined on said first end, which is defined by an arcuate edge line (124') which is substantially centered between said inside arcuate edge (134) and said outside arcuate edge (136) and a slot member, generally the mirror-image of the tab member defined on said first end, which is defined by a second arcuate edge line (126') which is substantially centered between said inside arcuate edge (134) and said outside arcuate edge (136) in opposition to said first arcuate edge line (124').

8. The friction disc (110) of claim 7 further including an interconnector edge line (128) angularly positioned to engage said first arcuate edge line (124) with said second arcuate edge line (126) of the first end of said segment (116) and a mirror-image interconnector edge line (128') angularly positioned to engage said mirror-image first arcuate edge line (124') with said mirror-image second arcuate edge line (126') of said opposed end of said segment (116).

9. A friction disc (110) for use in a clutch or brake assembly comprising: an annular core plate (114) and at least one substantially annular friction facing (112) adhered to said annular core plate (114), said friction facing (112) being composed of at least three arcuate segments (216), each arcuate segment having a first end and an opposed end and defining an inside arcuate edge (234) and an outside arcuate edge (236);

said first end of each arcuate segment (216) having a first tab member generally defined by a first arcuate edge line (224A) which is oriented generally one-third of the radial distance from said outside arcuate edge (236) to said inside arcuate edge (234), a first slot member, in opposition to said tab member, generally defined by a second arcuate edge line (226A) which is oriented generally one-third of the radial distance from said outside arcuate edge (236) to said inside arcuate edge (234) in opposition to said first arcuate edge line (224A), a second tab member generally defined by a third arcuate edge line (224B) which is oriented generally two-thirds of the radial distance from said outside arcuate edge (236) to said inside arcuate edge (234) and a second slot member, in opposition to said second tab member, generally defined by a fourth arcuate edge line (226B) which is oriented generally two-thirds of the radial distance from said outside arcuate edge (236) to said inside arcuate edge (234) in opposition to said third arcuate edge line (224B); and, said opposed end of each arcuate segment (216) having a first tab member, generally the mirror-image of the first slot member defined on said first end, which is defined by an arcuate edge line (224') which is oriented generally one-third of the radial distance from said outside arcuate edge (236) to said inside arcuate edge (234), a first slot member, generally the mirror-image of said first tab member defined on said first end, which is defined by a second arcuate edge line (26A') which is oriented generally one-third of the radial distance from said outside arcuate edge (236) to said inside arcuate edge (234) in opposition to said first arcuate edge line (224A'), a second tab member, generally the mirror-image of said second slot member defined on said first end, which is defined by a third arcuate edge line (224B') which is oriented generally two-thirds of the radial distance from said outside arcuate edge (236) to said inside arcuate edge (234) and a second slot member, generally the mirror-image of sad second tab member defined on said first end, which is defined by a fourth arcuate edge line (226B') which is oriented generally two-thirds of the radial distance from said outside arcuate edge (236) to said inside arcuate edge (234) in opposition to said third arcuate edge line (224B').

10. The friction disc (110) of claim 9, wherein the first end of said segment (216) further includes a first interconnector edge line (228A) angularly positioned to engage said first arcuate edge line (224A) with said second arcuate edge line (226A) and a second interconnector edge line (228B) angularly positioned to engage said third arcuate edge line (224B) with said fourth arcuate edge line (226B), whereby said first arcuate edge line (224B) and said fourth arcuate edge line (226B) are further connected together at a position substantially centered between said inside arcuate edge (234) and said outside arcuate edge (236); and the opposed end of said segment further includes a first interconnector edge line (228A') angularly positioned to engage said first arcuate edge line (224A') with said second arcuate edge line (226A') and a second interconnector edge line (228B') angularly positioned to engage said third arcuate edge line (224B') with said fourth arcuate edge line (226B'), whereby said first arcuate edge line (224A') and said fourth arcuate edge line (226B') are further connected together at a position substantially centered between said inside arcuate edge (234) and said outside arcuate edge (236).

* * * * *